United States Patent
Palitzsch

(10) Patent No.: US 10,041,142 B2
(45) Date of Patent: Aug. 7, 2018

(54) METHOD FOR CONCENTRATING METALS FROM SCRAP CONTAINING METAL

(71) Applicants: Ulrich Loser, Rosswein/ OT Grunau (DE); Wolfram Palitzsch, Freiberg (DE)

(72) Inventor: Wolfram Palitzsch, Freiberg (DE)

(73) Assignees: Ulrich Loser, Rosswein/OT Grunau (DE); Wolfram Palitzsch, Freiberg (DE)

( * ) Notice: Subject to any disclaimer, the term of this patent is extended or adjusted under 35 U.S.C. 154(b) by 241 days.

(21) Appl. No.: 14/783,111

(22) PCT Filed: Apr. 10, 2014

(86) PCT No.: PCT/DE2014/100127
§ 371 (c)(1),
(2) Date: Oct. 8, 2015

(87) PCT Pub. No.: WO2014/166484
PCT Pub. Date: Oct. 16, 2014

(65) Prior Publication Data
US 2016/0053343 A1    Feb. 25, 2016

(30) Foreign Application Priority Data
Apr. 12, 2013   (DE) .................. 10 2013 006 318

(51) Int. Cl.
*C22B 3/16*    (2006.01)
*C22B 3/46*    (2006.01)
(Continued)

(52) U.S. Cl.
CPC .................. *C22B 3/16* (2013.01); *C01G 5/00* (2013.01); *C01G 5/02* (2013.01); *C22B 3/46* (2013.01);
(Continued)

(58) Field of Classification Search
CPC .. C22B 3/16; C22B 3/46; C22B 7/006; C22B 11/042; C22B 13/045; C22B 25/04; C22B 25/06; C01G 5/00; C01G 5/02
See application file for complete search history.

(56) References Cited

U.S. PATENT DOCUMENTS

| 9,731,368 B2 * | 8/2017 | Chen .......................... C25C 1/00 |
| 2013/0276284 A1 * | 10/2013 | Brosseau ................ C22B 7/007 29/426.1 |
| 2015/0283615 A1 * | 10/2015 | Wang ....................... B22F 9/24 75/370 |

FOREIGN PATENT DOCUMENTS

| CN | 102191383 A | 9/2011 |
| DE | 4100839 A1 | 7/1992 |

(Continued)

OTHER PUBLICATIONS

DE 4100839 A1 published Jul. 1992. machine translation.*

*Primary Examiner* — George Wyszomierski
*Assistant Examiner* — Tima M McGurthy-Banks
(74) *Attorney, Agent, or Firm* — Michael Soderman

(57) ABSTRACT

The invention relates to a method for concentrating metals, in particular silver and/or tin and/or lead from scrap containing metal, by treating the material/scrap containing silver and/or tin and/or lead with a sulfonic acid of the formula R—SO$_2$—OH in the presence of an oxidizing agent, wherein R can be an organic group or ammonia.

8 Claims, 1 Drawing Sheet

(51) Int. Cl.
  *C22B 7/00*   (2006.01)
  *C22B 11/00*  (2006.01)
  *C22B 13/00*  (2006.01)
  *C22B 25/00*  (2006.01)
  *C01G 5/00*   (2006.01)
  *C01G 5/02*   (2006.01)
  *C22B 3/00*   (2006.01)
  *C22B 25/06*  (2006.01)

(52) U.S. Cl.
  CPC .............. *C22B 7/006* (2013.01); *C22B 7/007* (2013.01); *C22B 11/042* (2013.01); *C22B 11/048* (2013.01); *C22B 13/045* (2013.01); *C22B 25/04* (2013.01); *C22B 25/06* (2013.01); *Y02P 10/214* (2015.11); *Y02P 10/228* (2015.11); *Y02P 10/234* (2015.11); *Y02W 30/827* (2015.05)

(56) References Cited

FOREIGN PATENT DOCUMENTS

EP    1050604  A1   11/2000
WO     201113  A1   10/2011

\* cited by examiner

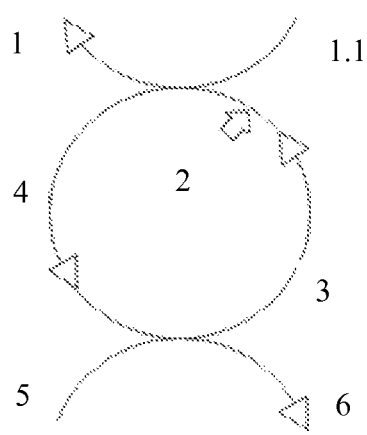

METHOD FOR CONCENTRATING METALS FROM SCRAP CONTAINING METAL

CROSS-REFERENCE TO RELATED APPLICATIONS

This application is the U.S. national stage of International Application No. PCT/DE2014/100127 filed on Apr. 10, 2014, and claims the benefit thereof. The application claims the benefit under 35 USC 119 of German Application No. DE 102013006318.3 filed on Apr. 12, 2013; all applications are incorporated by reference herein in their entirety.

BACKGROUND

The present invention relates to a method for concentrating or reclaiming metals from waste that contains metal, which is used especially for recycling catalysts containing metal, especially silver, or other waste that contains metal, especially silver and/or lead and/or tin, such as silicon wafers printed with silver, flexibly printed circuits based on nanosilver ink, and/or contacts consisting of silver nanowires and/or solders.

Silver is found among other things as a main component of most contacts on silicon wafers of photovoltaic modules or as an effective substance on catalysts which are used in the chemical industry for the production of ethylene oxide or formaldehyde. Further metals that occur in waste are lead and/or tin for example. Silver and other metals such as lead and/or tin are used for lesser-known applications such as bearings for motors, batteries, RFID tags, solders and inks for circuit boards. Hydrometallurgical recycling methods are used both for silver catalysts and also for silver contacts on silicon wafers, which recycling methods are based on nitric acid and cannot be operated without a complex and expensive gas purification system due to the development of nitrous gases. On the other hand, pyrometallurgical methods are known, which reach their economic limits due to rising energy prices however, which is also due to the decreasing silver concentration in the material is to be processed, which is the result of successful savings in silver material in production. In view of stiff competition and rising energy prices, there is a need for an improved recycling method which can be applied as flexibly as possible and which offers improved profitability.

SUMMARY

The invention involves a method for the concentration of metals, especially silver and/or tin and/or lead, from metal-containing waste, in that the material/the silver-containing and/or tin-containing and/or lead-containing waste is treated with a sulfonic acid of the formula R—$SO_2$—OH in the presence of an oxidising agent, wherein R is an organic group. In the case of silver-containing waste, a silver sulfonate solution leads to the precipitation of the silver as silver chloride by adding stoichiometric quantities of HCl and also leads, at the same time, to the reformation of the respective sulfonic acid, and/or the mixture of sulfonic acid, and an oxidising agent transfers lead and/or tin to their readily soluble sulfonates in silver-containing waste or other waste is extracted therefrom and made available for further use.

DETAILED DESCRIPTION

It is thus the object of the invention to provide a method for the concentration or reclamation of metals from metal-containing waste and thus a universal recycling method which surpasses the recycling methods of the prior art both economically and ecologically. The object of the invention was surprisingly achieved as stated in the claims.

The present invention therefore relates to a hydrometallurgical method that is highly versatile in application for the treatment waste containing metal, especially silver and/or lead and/or tin.

In accordance with the method, the reclamation of metals such as silver and/or lead and/or tin occurs from metal-containing waste (especially such containing silver and/or lead and/or tin), in that the waste is treated with a sulfonic acid of the formula R—$SO_2$—OH in the presence of an oxidising agent, wherein R can be an organic group or an amido group (—$NH_2$).

This new universal method overcomes the disadvantages of previously applied methods, namely the loss of the employed solvents and the likelihood of the formation of highly poisonous gases such as nitrous gases.

The waste is crushed if necessary before the hydrometallurgical treatment in such a way that the metal-containing materials (such containing silver and/or lead and/or tin) are made accessible to a liquid. The waste material is coated with a mixture of diluted sulfonic acid, preferably methane sulfonic ($CH_3$—$SO_2$—OH) and an oxidising agent, preferably hydrogen peroxide. The silver and/or silver oxide are surprisingly dissolved immediately, until a maximum concentration of 713 g/L of silver mesylate ($CH_3$—$SO_2$—O—Ag) at 23° C. is reached. This saturated silver mesylate solution is placed in a stoichiometric ratio with HCl, so that the silver dissolved therein is precipitated completely as pure silver chloride, which is filtered out and washed. At the same time, the sulfonic acid is thus reclaimed, which is now again available for a renewed treatment of further silver-containing materials or waste, so that the sulfonic acid can be regarded as a kind of an extraction agent which is not consumed. It is thus economically achieved to concentrate and reclaim even the slightest quantities of silver from a large variety of silver-containing materials. A further relevant advantage of this method lies in the environmental compatibility of methane sulfonic acid, since it is biologically degradable according to the OECD guideline 301A. Combinations such as p-toluenesulfonic acid/hydrogen peroxide, amidosulfonic acid/hydrogen peroxide or amidosulfonic acid/ammonium persulphate act similarly and supply pure silver chloride and the respective sulfonic acid according to the following treatment with stoichiometric quantities of HCl (relating to the silver concentration).

BRIEF DESCRIPTION OF THE DRAWINGS

The invention will be explained below in closer detail by reference to a drawing and embodiments.

FIG. 1 shows a diagram on the basis of the example for the system of silver-containing waste/methane sulfonic acid/hydrogen peroxide how a continuous extraction and thus concentration of the metal (silver in this case) is carried out.

DETAILED DESCRIPTION OF THE PREFERRED EMBODIMENTS

The principal sequence according to FIG. 1 on the basis of the example silver and methane sulfonic acid is the following:

Silver-containing waste 1.1 in the form of Ag/matrix is treated with a mixture of hydrogen peroxide 2 ($H_2O_2$) and methane sulfonic acid 3 (H—$OSO_2CH_3$ or $CH_4SO_3$). Silver mesylate 4 (Ag—OSO$_2$CH$_3$) is obtained at first which is highly soluble. The silver was thus removed from the silver-containing waste 1.1, so that the demetallised waste 1 can be disposed of or recycled in another manner. The silver content of the obtained solution can be determined analytically, so that the low-soluble silver chloride 6 (AgCl) can be precipitated subsequently with the stoichiometric quantity of hydrogen chloride (HCl). In this process, the hydrogen ion of HCl is exchanged for the silver, so that in the end methane sulfonic acid (H—OSO$_2$—CH$_3$) is formed back again.

A number of specific embodiments are explained below:

Embodiment 1

A mixture of 100 g of 50% methane sulfonic acid (CH$_4$O$_3$S) and 10 g of 30% hydrogen peroxide (H$_2$O$_2$) were added to 100.39 g of used silver-containing catalyst material (waste material). The originally dark colour of the catalyst material disappeared immediately and the white base body of the waste material of aluminium oxide became visible. The solution was filtered out and analysed. The silver content was determined at 35 g/L. 0.626 g of 32% hydrochloric acid (HCl) were added to 78.08 g of this solution, wherein the silver (Ag) was precipitated immediately as low-soluble silver chloride (AgCl). It was filtered out, washed and dried. The silver chloride thus obtained had a mass of 2.68 g. The filtrate contained the reclaimed methane sulfonic acid CH$_4$O$_3$S.

Embodiment 2

13.89 g of silicon cell rupture material, on which only the silver-containing contacts were present, were coated with a mixture of 20 g of 50% methane sulfonic acid and 2 g of 30% hydrogen peroxide. The silver strands on the silicon platelets dissolved rapidly, wherein the solution became slightly grey and turbid, which was caused by the insoluble components of the silver pastes. This solution was filtered and analysed. The silver content was 8.1 g/L. After the addition of 170 mg of 32% hydrochloric acid, the precipitated silver chloride was washed, dried and weighed. The yield was 0.21 g.

Embodiment 3

5 g of silver powder were covered with 13.5 g of a 25% amidosulfonic acid solution (NH$_2$—SO$_2$—OH). For this purpose, 10 drops of a 35% hydrogen peroxide solution were added slowly. After the complete dissolution of the silver, 12 g of a 31% solution were added to the clear solution and the obtained white precipitation of silver chloride was filtered out. Yield: 6.6 g of AgCl.

Embodiment 4

20 g of waste, consisting of flexible thin-film photovoltaic cells, were cut and a total of 500 mL of a 40% methane sulfonic acid solution were added thereto. 40 mL of a 50% hydrogen peroxide solution were added under stirring and filtering was performed after the dissolution of the photoactive connecting semiconductor layer and the silver contacts and the solution was analysed: 2000 mg/L of Ag, 2000 mg/L of Se, 400 mg/L of Cu, 750 mg/L of In and 120 mg/L of Ga. 1 g of a 33% HCl solution was dripped into this solution, wherein a white precipitation was produced immediately. It was filtered out and dried. Yield 1.3 g of AgC. No silver was found any more in the filtrate, but certainly the other metals.

A method is provided with a solution in accordance with the invention with which it is possible to extract ecologically and economically valuable metals such as silver, lead, tin from respective metal-containing waste such as catalysts or waste from the photovoltaic industry and to make such metals available for further use.

LIST OF REFERENCE NUMERALS

1 Demetallised waste (matrix)
1.1 Silver-containing waste (Ag matrix)
2 Hydrogen peroxide (H2O2)
3 Methane sulfonic acid, the simplest organo-sulfonic acid (H—OSO2CH3)
4 Silver mesylate, the simplest silver organo-sulfonate (Ag—OSO2CH3)
5 Hydrogen chloride (HCl)
6 Silver chloride (AgCl)

The invention claimed is:

1. A method for the concentration of silver from silver-containing waste, comprising the steps that silver-containing waste is treated with a sulfonic acid of a formula R—SO$_2$—OH in the presence of an oxidizing agent, wherein R is an organic group, to form a silver sulfonate solution, wherein a stoichiometric quantity of HCl is added to the silver sulfonate solution to precipitate silver as silver chloride and at the same time to reform sulfonic acid, and wherein treatment of the silver-containing waste takes place with at least 15% sulfonic acid that is 1/10 by mass of a 30% hydrogen peroxide solution, calculated on 50% sulfonic acid, which leads to the formation of the silver sulfonate.

2. A method according to claim 1, characterized in that the organic group is —CH$_3$ or —NH$_2$.

3. A method according to claim 2, characterized in that 15% to 50% by mass of methane sulfonic acid is used as sulfonic acid.

4. A method according to claim 1, characterized in that treatment occurs at ambient temperature.

5. A method according to claim 4, characterized in that the treatment time is reduced by increasing the temperature in comparison with the ambient temperature and/or an increase in the oxidizing agent concentration.

6. A method according to claim 1, characterized in that the method is operated continuously by continuous regeneration of the sulfonic acid.

7. A method for the concentration of silver from metal-containing waste, comprising the step that silver-containing waste is treated with a sulfonic acid of a formula R—SO$_2$—OH in the presence of an oxidizing agent, wherein R is an organic group, and further, treatment of this silver-containing waste with at least 15% sulfonic acid that is 1/10 by mass of a 30% hydrogen peroxide solution, calculated on 50% sulfonic acid, leads to the formation of silver sulfonate.

8. A method for the concentration of silver from metal-containing waste, comprising the steps that silver-containing waste is treated with a mixture of sulfonic acid of a formula R—SO$_2$—OH in the presence of an oxidizing agent, wherein R is an organic group, to form a silver sulfonate solution and a stoichiometric quantity of HCl is added to the silver sulfonate solution to precipitate silver as silver chloride and at the same time to reform sulfonic acid, such that the silver-containing waste is treated by a hydrometallurgical method, the mixture of sulfonic acid comprises hydrogen peroxide (H$_2$O$_2$) and methane sulfonic acid (CH$_3$—SO$_2$—

OH or $CH_4SO_3$), the silver is dissolved from the silver-containing waste, and the silver is selectively precipitated.

* * * * *